United States Patent Office  
3,614,918  
Patented Oct. 26, 1971

3,614,918  
PHOTOGRAPHIC CAMERAS  
Walter Hennig and Heinz Schulze, Dresden, Germany, assignors to VEB Pentacon Dresden Kamera- und Kinowerke, Dresden, Germany  
Filed Dec. 5, 1968, Ser. No. 781,482  
Int. Cl. G03b 7/00, 15/05  
U.S. Cl. 95—10    4 Claims

ABSTRACT OF THE DISCLOSURE

The camera in combination with a flash lamp apparatus is constructed with the light path through the camera. A change over switch is provided in the camera housing which connects alternately a quantitative light meter and a photometer to the photoelectric cell according to choice by means of a changeover switch.

BACKGROUND OF INVENTION

The invention relates to a photographic camera with a photo-electric cell for exposure control purposes, situated in the path of the light lens from the objective lens.

Cameras are known in which a photo-electric cell is used which is illuminated by the light rays entering the objective and which serves as a photo-sensitive receiver either for a photometer or for a quantitative light-meter for controlling the illumination time of a flash bulb. If a camera is to be fitted either with a photometer or with a quantitative light-meter of the conventional design, this necessitates measures which complicate and enlarge the structure of the camera.

The purpose of the invention is to equip a photographic camera, in a space-saving manner, both with a photometer and with a quantitative light-meter in order to increase its applicability for measuring and control functions before and during the exposure.

According to the invention a camera is provided in combination with a flash lamp apparatus, said camera including a housing having an objective mounted thereon, a camera shutter and drive mechanism therefor, and an exposure meter having a photoelectric cell disposed in the path of the light rays entering through the objective, and a current source in said camera; in which there is provided a photometer in said camera housing connected to said current source, a quantitative light meter between said current source and the lamp of said flash lamp apparatus for determining the illumination period of said flash lamp apparatus, and a change-over switch in said housing, which change-over switch in one operative position thereof serves to connect the photoelectric cell with the photometer and in a second operative position connects the photoelectric cell with the quantitative light meter.

BRIEF DESCRIPTION OF DRAWINGS

The invention will be explained in conjunction with examples illustrated and described in the accompanying drawings in which.

Figure 1:
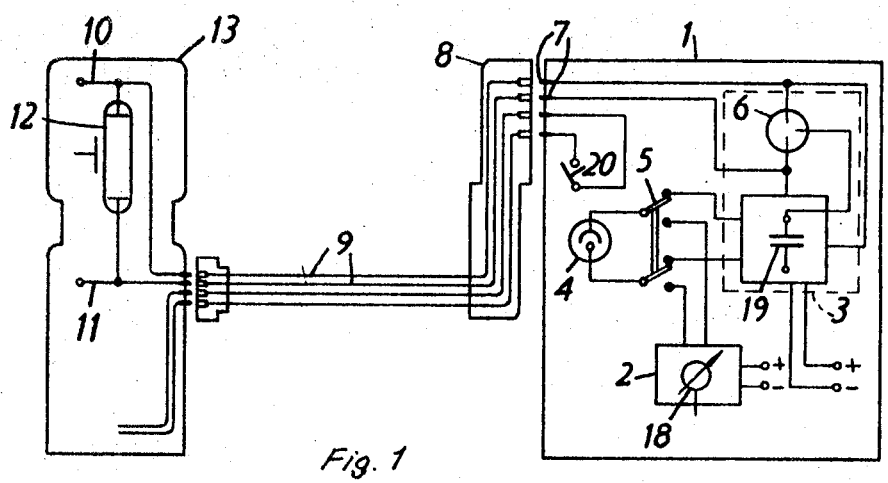
FIG. 1 is a photographic camera with a built-in photometer and quantitative light-meter.

In the example shown in FIG. 1 the camera housing 1 contains the photometer 2 which energizes the galvanometer 18 in the known manner. The photometer 2 can be connected via a changeover switch 5 to a photoelectric cell 4 which is mounted in the path of the rays, on the camera side, of an objective lens not shown separately. By means of the changeover switch 5 the photo-electric cell 4 can be disconnected from the photometer and connected to the quantitative light-meter 3 likewise built into the camera housing. The quantitative light-meter 3 has an integration element consisting of a condenser 19 which, after being charged up sufficiently, ignites the thyratron 6 acting as an inertia-less switching element. This effect is utilized in order to cause the operating voltage of the flash bulb 12 of the flash apparatus 13 to collapse, which results in the immediate extinction of the flash bulb 12. The anode and the cathode of the thyratron 6 are therefore provided with connecting contacts 7 which are mounted on the camera housing 1 and to which the contact plug 8 can be attached. The thyratron 6 is connected with the anode 10 and the cathode 11 of the flash bulb 12 via cable 9. The switch 20, likewise built into the camera housing 1, is operated in the known manner by the shutter mechanism when the latter is running off and ignites the flash bulb 12, which consequently comes on.

Figure 2:
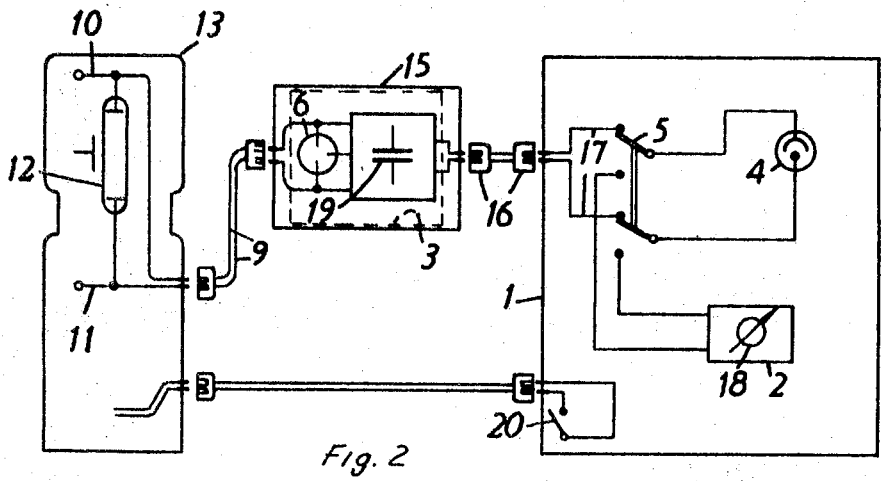
FIG. 2 is a photographic camera with built-in photometer and with a light-meter mounted in an adaptor.

The version shown in FIG. 2 has a camera 1 in which the quantitative light-meter 3 is mounted in an adaptor 15 which can be connected with the camera 1 or with the flash apparatus 13. Via plug contact 16 the quantitative light-meter 3 can be connected on the input side with conductors 17 which can be connected via the changeover switch 5 to the photo-electric cell 4. The method of operation is the same as in the version shown in FIG. 1.

Figure 3:
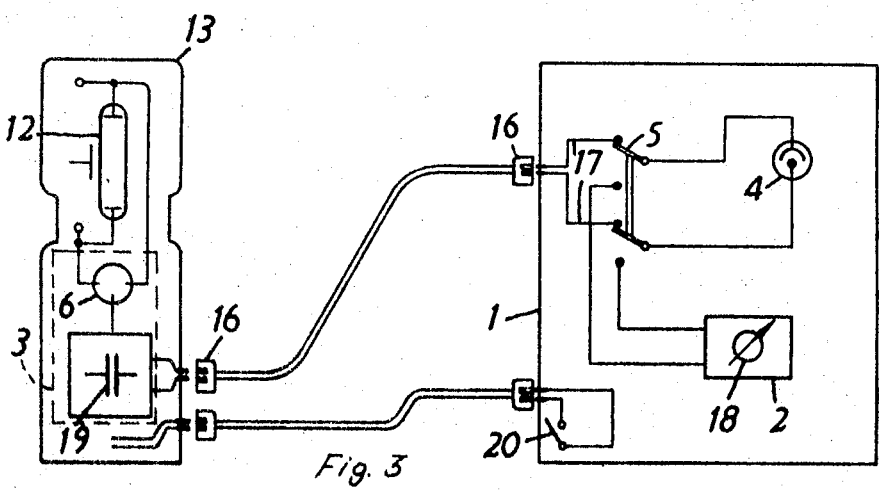
FIG. 3 is a photographic camera with a built-in photometer and with quantitative light-meter provided in a flash apparatus.

FIG. 3 shows a version in which the photo-electric cell 4 and the photometer 2 are mounted in the camera housing while the quantitative light-meter 3 is built in the flash apparatus 13. Via plug contacts 16 the quantitative light-meter 3 can be connected to the input side to conductors 17 with which the changeover switch 5 is connected.

We claim:
1. In a photographic camera in combination with an attachable electronic flash lamp apparatus, said camera including a housing having an objective mounted thereon, a camera shutter and drive mechanism therefor, and an exposure meter having a photoelectric cell disposed in the path of the light rays entering through the objective, and a current source in said camera; the provision of
   (a) a photometer in said camera housing connected to said current source,
   (b) a quantitative light meter between said current source and the lamp of said flash lamp apparatus for determining the illumination period of said flash lamp apparatus, and
   (c) a change-over switch in said housing, which change-over switch in one operative position thereof serves to connect the photo-electric cell with the photometer and in a second operative position connects the photoelectric cell with the quantitative light meter.

2. A photographic camera according to claim 1, including contact sockets provided on the housing and on the flash lamp apparatus, a plug-in cable connector engaging said sockets to connect said housing and said flash lamp apparatus, said quantitative light meter being arranged within said housing with its output connected to the contact socket of the housing.

3. A photographic camera according to claim 1, including contact sockets provided on the housing and on the flash lamp apparatus, an adaptor containing said quantitative light meter and having contact sockets, a first plug-in cable connector between said camera housing and said adaptor and a second plug-in cable connector between said adaptor and said flash lamp apparatus.

4. A photographic camera according to claim 1, including contact sockets provided on the housing and on the flash lamp apparatus, a plug-in cable connector engaging said sockets to connect said housing and said flash lamp apparatus, said quantitative light meter being arranged within said flash lamp apparatus with its input connected to the contact socket of the flash lamp apparatus.

References Cited

UNITED STATES PATENTS

| | | | |
|---|---|---|---|
| 3,057,254 | 10/1962 | Drury, Jr. | 95—10 C X |
| 3,205,802 | 9/1965 | Wareham | 95—11.5 |
| 3,288,044 | 11/1966 | Bramer | 95—11.5 |
| 3,485,152 | 12/1969 | Fuwa | 95—10 C |

SAMUEL S. MATHEWS, Primary Examiner

J. F. PETERS, JR., Assistant Examiner

U.S. Cl. X.R.

95—42; 240—1.3